United States Patent [19]
Cohen et al.

[11] Patent Number: 6,125,400
[45] Date of Patent: Sep. 26, 2000

[54] METHOD AND SYSTEM OF RUNNING OBJECT ORIENTED PROGRAMS ACROSS A NETWORK THROUGH COMPRESSION AND DISTILLATION OF REMOTE METHOD INVOCATION

[75] Inventors: Geoffrey Alexander Cohen, Durham; David Louis Kaminsky, Chapel Hill; Jonathan Michael Seeber, Durham, all of N.C.

[73] Assignee: International Business Machines Corporation, Armonk, N.Y.

[21] Appl. No.: 08/967,804

[22] Filed: Nov. 10, 1997

[51] Int. Cl.[7] .................................................. G06F 13/00
[52] U.S. Cl. ..................... 709/247; 709/203; 709/231; 709/232; 709/235; 709/236; 709/300; 709/302; 709/303; 709/304; 709/305; 709/246; 707/103; 712/220; 395/705; 395/707
[58] Field of Search ..................................... 709/201, 202, 709/303, 235, 304, 247, 246, 203, 300, 302, 305, 231, 232, 236; 712/220; 707/103; 395/705, 707

[56] References Cited

U.S. PATENT DOCUMENTS

| | | | |
|---|---|---|---|
| 5,295,256 | 3/1994 | Bapat | 395/705 |
| 5,317,742 | 5/1994 | Bapat | 709/300 |
| 5,446,901 | 8/1995 | Owicki et al. | 711/154 |
| 5,548,723 | 8/1996 | Pettus | 709/228 |
| 5,699,310 | 12/1997 | Garloff et al. | 395/701 |
| 5,774,719 | 6/1998 | Bowen | 709/300 |
| 5,778,228 | 7/1998 | Wei | 709/304 |
| 5,815,708 | 9/1998 | Kessler et al. | 395/683 |
| 5,815,709 | 9/1998 | Waldo et al. | 395/683 |
| 5,832,219 | 11/1998 | Pettus | 709/203 |
| 5,838,979 | 11/1998 | Hart et al. | 395/707 |
| 5,860,004 | 1/1999 | Fowlow et al. | 395/701 |

OTHER PUBLICATIONS

Mark Wutka, "Chapter 18, Using CORBA IDL with Java".
IONA's Java language mapping for IDL (for OrbixWeb).
Jaba Platform 1.2, Package org.omg CORBA, 1993.
Mapping IDL to Java, http//www.javasoft.com/products/jdk/1.2/docs/guide/idl/mapping/idl.fm.html.
Birrell et al., SRC Research Report, Network Objects, Digital Systems Research Center, Dec. 1995.

*Primary Examiner*—Frank J. Asta
*Assistant Examiner*—William C. Vaughn, Jr.
*Attorney, Agent, or Firm*—Jeannie S. Ray-Yarletts

[57] ABSTRACT

A method and system for reducing the amount of information sent across a socket when invoking an application using a remote method invocation. The present invention involves creating a list of the classes and fields contained within the application that is to be distributed and determining which of the fields are actually required for the remote method invocation under analysis. Any fields that are in the method but are not necessary for the invocation are marked with place holders.

9 Claims, 5 Drawing Sheets

| | |
|---|---|
| Serialization Header | 301 |
| Description of C | 303 |
| Marker for A | 305 |
| Serialized B | 307 |
| Marker for foo1 | 309 |
| Real foo2 | 311 |

FIG. 3

METHOD AND SYSTEM OF RUNNING OBJECT ORIENTED PROGRAMS ACROSS A NETWORK THROUGH COMPRESSION AND DISTILLATION OF REMOTE METHOD INVOCATION

RELATED APPLICATIONS

The present application is related to U.S. patent application Ser. No. 08/941,815 entitled *Apparatus and Method for Dynamically Modifying Class Files During Loading for Execution* filed on Sep. 30, 1997 and assigned to the assignee of the present application.

FIELD OF THE INVENTION

The present invention relates generally to computer programming methods and systems, and, in particular to object oriented programming and to methods and systems of running object oriented programs on multiple distributed computers connected by a network.

BACKGROUND

The object serialization and remote method invocation (RMI) of Sun Microsystem's Java are becoming popular as a way of running distributed applications. Using RMI, an application can make a method call against an object residing on another machine. This allows the distribution of work across multiple machines by placing interrelated applications on different machines and using RMI calls to pass execution between the applications. In addition, RMI uses Java serialization to pass objects as parameters between the methods or objects comprising remote applications. Serialization is Java's way of "flattening" (transforming) an object into a series of bytes that can later be reassembled. "Flattening" the objects allow them to flow across a network. In the case of RMI, the bytes are reassembled ("unflattened") on a remote machine and used by the remote application. This is shown in FIG. 2 where the object (201) is "flattened" and turned into a byte stream (203) to be transmitted across the socket (205). At the destination node, the byte stream (207) is "unflattened" and reconstructed as an object (209).

Java defines a default serialization for objects such that, when a programmer specifies that an object "implements" the serializable interface, the object is given the default serialization. The programmer can override the default serialization, but the default serialization is rather efficient and overriding it is seldom necessary.

To preserve the semantics of the object being passed, and thus the semantic of the remote method invocation, Java flattens all data contained in an object into the serialized byte stream. However, any single method call (or remote method call) is unlikely to use all of the object's fields. Thus, serializing the entire object causes unnecessary bytes to flow.

If the object is serialized only for remote calls that use a common subset of the object's fields, the programmer can specify a serialization that sends only those fields. However, that methodology forces the programmer to do additional, error-prone work. Also, since in Java the programmer can specify only a single serialization, he must flatten all fields in the method even though any single method invocation may not use all of the fields. This leads to unnecessary network traffic.

OBJECT OF THE INVENTION

It is an object of the present invention to reduce the number of bytes sent on a network during a remote method invocation.

It is further an object of the present invention to use context-based analysis of the called method, also referred to as the "callee", to reduce the number of bytes sent during a remote method invocation.

It is another object of the invention to utilize recursive analysis of remote method invocations to reduce the amount of information sent to invoke a remote application (or method and class).

SUMMARY OF THE INVENTION

The present invention describes a system, method and program product for executing remote method calls efficiently over a network. As shown in FIG. 1, an object oriented program is written with many interdependent objects that call each other to perform a unified function. In client/server object systems, some of the objects, for example 107 and 109, will reside in the memory of the client 103 and some of the objects, for example 105, will reside in the memory of the server 101. This is often done to balance workload between the client 103 and server 101 or to exploit unique resources present on the client or the server.

Objects residing on the client access methods executed against objects residing on the server by using Java's remote method invocation; similarly, objects residing on the server access methods executed against objects residing on the client by using Java's remote method invocation. When an object on one computer makes a call to an object residing on another computer, and passes an object as a parameter, that entire object is "serialized" (flattened) and transmitted to the other computer.

The present invention intervenes prior to serialization to determine which fields are unused in a particular remote invocation and either during or after the serialization to compress the serialized object by removing from the data stream parts of the object that are unused by the callee. The present invention, through either textual analysis or byte code analysis of the callee, determines which fields are unused therefore candidates for removal and which fields of the serialized object will be used by the callee. Those fields that are not used by the callee are replaced in the serialized data stream with small place holders that are used when decompressing the stream before use by the callee. The compressed stream is then transmitted across the network using normal means, and decompressed at the remote computer. Because only information that is determined not to be used by the callee is eliminated from the data stream, the compress/decompress process does not alter the semantics or operation of the program.

The present invention is more clearly understood by example. Consider a car object that contains objects such as a transmission, an ignition, an array of four wheels, a stereo, a horn, and an array of lights, and a mechanic object that has methods such as a TuneUp method, a TireRotation method, and an Inspection method for example. The car object also has a reference to its mechanic. In pseudocode, this example might look like:

```
Class Car {
    Transmission transmission;
    Ignition ignition;
    Wheel wheel[4];
    Stereo stereo;
    Horn horn;
    Lights lights[12];
```

-continued

```
...
  Mechanic mechanic;
}
Class Mechanic {
  void TuneUp (Car car) {// functional tune-up code inserted here
  }
  void TireRotation (Car car) {// functional tire rotation code inserted here
  }
  Inspection (Car car) {// functional inspection code inserted here
  }
}
```

To get the car inspected by the mechanic requires pseudocode in the Car such as:

mechanic.lnspection (this);

which calls the mechanic's inspection method and passes this instance of the car.

Of course, an inspection doesn't look at the entire car, only safety-related areas that might vary over time. Therefore, the mechanic will only access a subset of the car's member objects such as the tires, the horn and the lights in the present example; the other member objects are unused.

The compression process of the present invention analyzes the code for the mechanic class and determines which parts of the car are required by the inspection method. After serialization flattens the entire car into a byte stream, the compression process eliminates the data related to uninspected car parts (e.g., the stereo), thereby reducing network flows. Before the mechanic gets the Car object, the decompression process inserts dummy (e.g. NULL) values for the unused objects.

Note that in this example, the compression would likely be substantial as the stereo is not a single part, but itself an object comprised of many parts.

BRIEF DESCRIPTION OF THE DRAWINGS

FIG. 3 represents the data that is sent to the remote computer using the present invention.

DETAILED DESCRIPTION OF THE PREFERRED EMBODIMENT

The present invention is comprised of two subsystems: analysis and compression/decompression. The analysis process determines which parts of parameter objects can actually be used by the called method; the compression/decompression process removes unused portions of the object from the data stream before sending, and reconstitutes the data stream upon receipt of the compressed data stream. Both subsystems are described in further detail with reference to the figures.

The analysis of the present invention operates either on source text or on the byte codes prior to them being sent across the socket, hence the analysis must be invoked before any remote calls can be made. By performing analysis before a remote call is made, the process ensures that all control data for distillation is available at run-time. Both source text and byte code analyses are described below.

Source analysis is somewhat similar to analysis done by modern compilers. Modern compilers commonly analyze which variables are used in which modules. Many issue warnings if a declared variable is not used in a module. However, they do not apply this same analysis to the fields in objects. That is, if a method uses an object A, then the compiler issues no warning, even if A uses at most one to the 100 fields in A.

The source analysis of the present invention determines that certain fields are not used. Specifically, if a variable is referenced, the compiler must generate the code to access that variable. Thus, by comparing the list of variables to the list of accessed variables, the analyzer can determine which variables are not used. Note that since Java has no pointer variable, all access to fields of an object must be made by referring to that field directly. Thus, the compiler knows in all cases which fields of an object are accessed.

Figure 4:
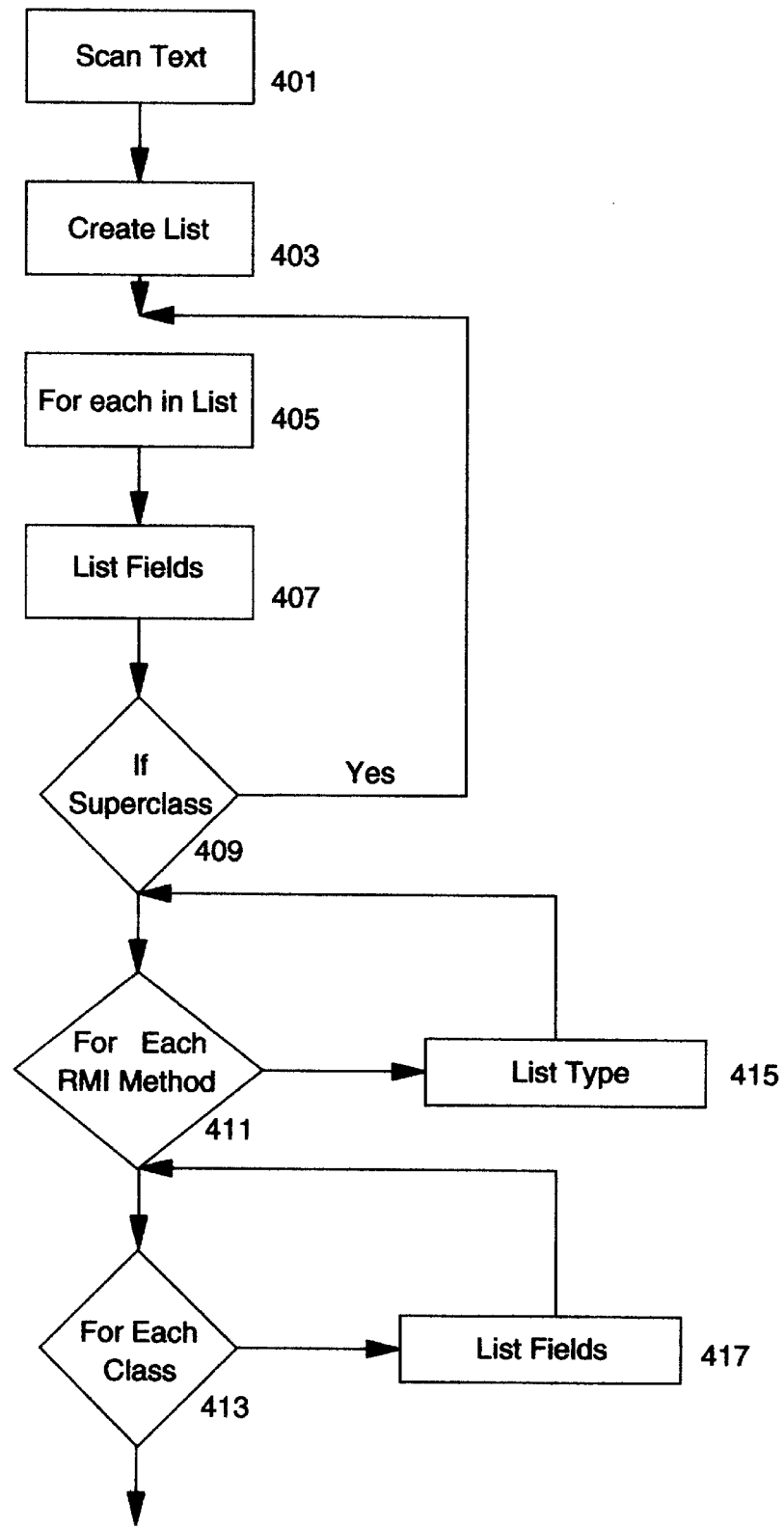
FIG. 4 is a flow chart depicting logic of the enumeration in the preferred embodiment.

The analysis process consists of two phases: field enumeration and field marking. Enumerating entails listing the name of each field in a class, then recursively listing each field in the superclasses. Field marking entails scanning the source text of the called program, also referred to as the callee, and pattern matching against the fields enumerated above. When a match is found, the field is marked "USED." This is further clarified in FIGS. 4 and 5.

First the analyzer, in the enumeration phase, scans the text or byte code under analysis (401) and creates a list (403) of all of the objects passed as parameters in an RMI call or invocation. Next, for each object in the list (405) the analyzer creates a list of each field in the class (407) and, if the field contains a superclass (409), adds each field in the superclass to the list (407). This process recursively continues until all superclasses have been added to the list. Once this has completed, the list contains all of the fields in the object under analysis and all of the fields in all of the superclasses.

Next, the analyzer enters a scanning phase. For each method called by an RMI invocation (411), the analyzer lists the type (classes) of the objects passed as parameters (415); then for each class in the list most recently created (413), the results from the initial creation of the list (407) are used to produce a list of the fields in the classes of the objects passes as parameters (417).

At this point, a table has been created containing, for each method call, a list of classes and what fields are included in that class. This table is called the "Thinning Table."

Figure 5:
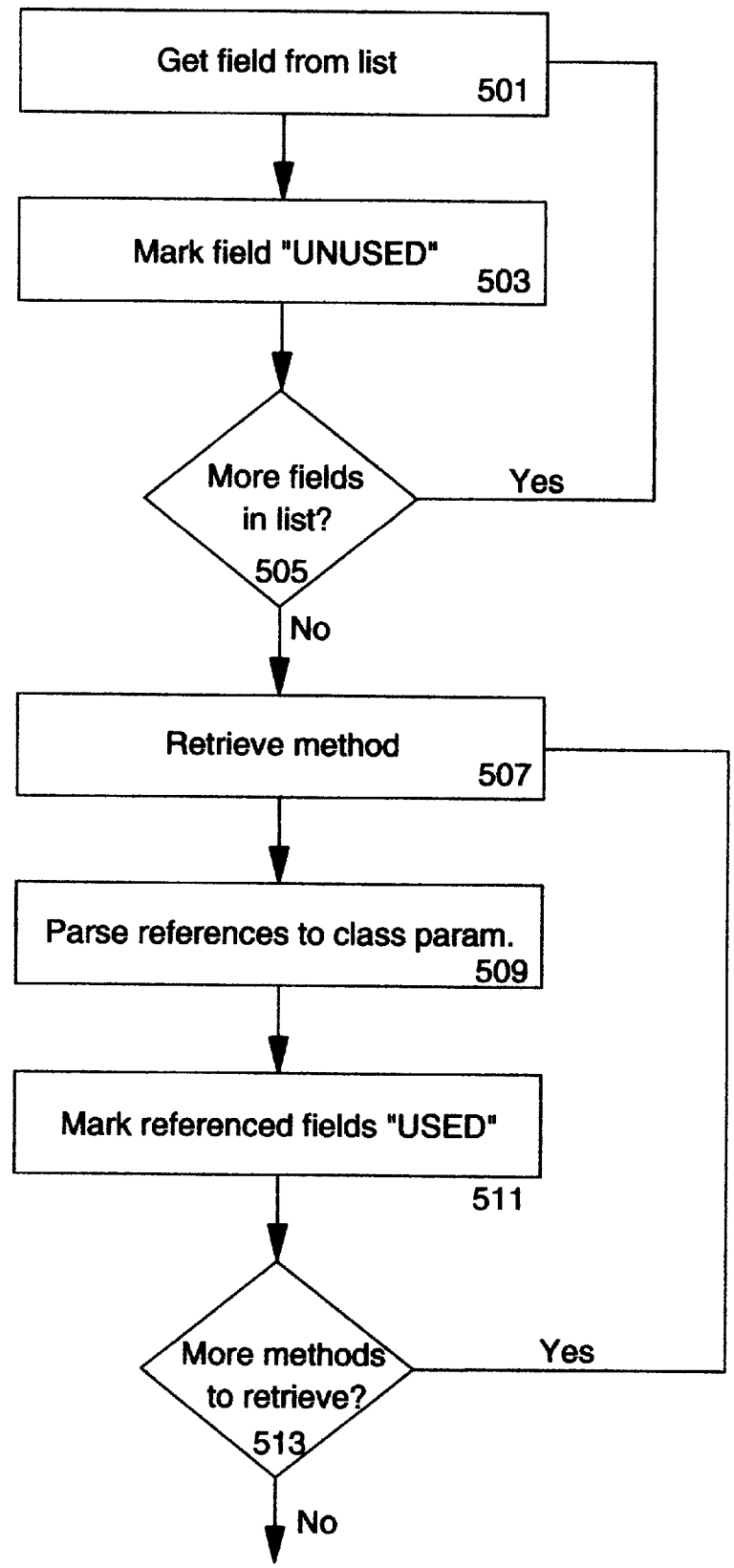
FIG. 5 is a flow chart further depicting the logic of the field marking in the preferred embodiment.

Next, referring to FIG. 5, the enumeration phase begins and the analyzer processes the list such that, for each field (505) in the lists created above (501), the fields are marked as "UNUSED" (503). Then, for each method (513), the text or byte code of that method is retrieved (507) and is parsed for references to the class parameter (509). References to fields in a superclass are determined based on standard Java scoping rules. (Such parsing and scoping are standard compiler technology.) Then, for each class reference, the field that is referenced is marked as "USED" (511). When marking the referenced fields used, the preferred embodiment of the present invention utilizes the following conservative assumptions although the assumptions used in the preferred embodiment are not meant to limit the invention in any way:

a) If the parameter is passed from the called method to another method, every field in the class is marked "USED", and the process terminates. Since Java code is bound only at run-time, this ensures that the analysis is accurate when code is dynamically replaced.

b) If the parameter is written to a stream of any sort, then every field in the class is marked "USED" and the process is terminated.

Since streams are used to access files and sockets, both of which can be used for persistence, it is necessary to send the entire object. This is necessary for persistent objects because other programs, written after the analysis, might access fields that would not otherwise be sent.

c) If a field of the remote object or a field of any object on the remote computer with access to the parameter object via standard Java scoping rule is assigned to the value of the parameter object or any member of the parameter object, then every field in the class is marked "USED" and the process is terminated. Such fields can be accessed later by other objects in ways not detectable by the analysis of the preferred embodiment.

d) If a method on the class passed as a parameter is called anywhere in the remote method (callee), then every field in the class is marked "USED" and the process is terminated. This convention is similar to (a) and simplifies the analysis.

Note that the process described in the preferred embodiment does not recursively analyze classes. That is, if an object A contains an object B, and only part of object B is accessed, we still send the entire B object. This simplifies the analysis at the expense of potential compression. To one skilled in the art, it is straightforward to apply recursion to the analysis potentially producing better compression at the expense of complexity.

While the above enumerated assumptions potentially increase the number of bytes transmitted, they ensure that semantics are preserved, and simplify the analyzer.

Consider the example given in pseudocode below:

```
class A {
  int w[10]; // array of 10 integers
  char x[20]; // array of 20 characters
  // other code
}
class B {
  float y[10]; // array of 10 floats
  double z[20]; // array of 20 doubles
  // Other code
}
class C {
  A a; // object of type A
  B b; // object of type B
  int foo1;
  float foo2;
  // other code
}
and the remote class has a method "bar" that takes a parameter of type C:
class RemoteClass {
  double bar (C c) {
    double temp = 0.0;
    for (int i= 0; i < 10; i++) temp += (c.b.y[i] + c.b.z[i]);
    temp = temp * c.foo2;
    return (temp);
  }
}
```

Applying the analysis described above to the example above, first the text is scanned (401) and a list is created (403) of all objects passed as parameters in an RMI call, this results in our list containing "C". Next, for each object in the list (405), hence "C", a list is created comprising the fields in the class (407). "C" has the fields "a", "b", "foo1" and "foo2". A check is then made to determine if any superclasses exist (409), of which there are none in the present example. Next, for each method called via RMI (411), a list is made of the type (classes) of the objects passed as parameters (415). In the present example, "RemoteClass" is the only method and it has only a class of type "C". Next, for each class in the list (413), produce a list of fields in the class (417). Using the notation Method.Object.Field, the fields are:

RemoteClass.c.a

RemoteClass.c.b

RemoteClass.c.foo1

RemoteClass.c.foo2

Then, for each field (501) in the lists created above, mark the fields "UNUSED" (503).

RemoteClass.c.a=UNUSED

RemoteClass.c.b=UNUSED

RemoteClass.c.foo1=UNUSED

RemoteClass.c.foo2=UNUSED

Next, for each method (507), parse the text (or byte codes) for references to the class parameter (509). References to fields in a superclass are determined based on standard Java scoping rules. (Such parsing and scoping is standard compiler technology.) In the present example, the statement:

for (int i=0; i<10; i++) temp+=(c.b.y[i]+c.b.z[i]);
references "RemoteClass.c.b", and temp=temp * b.foo2;
references "RemoteClass.c.foo2"

The next step in the analysis process determines that for each reference, mark the field that is referenced "USED" (511) which results in the present example as:

RemoteClass.c.b=USED

RemoteClass.c.foo2=USED

At the conclusion of this process, using the example of the above, the resultant list is:

RemoteClass.c.a=UNUSED

RemoteClass.c.b=USED

RemoteClass.c.foo1=UNUSED

RemoteClass.c.foo2=USED

Thus, when class C is serialized for a call to RemoteClass, fields "b" and "foo2" will be sent in their entirety, while fields "a" and "foo1" will be stubbed or substituted with small markers.

At run-time, before the caller serializes a object for transmission to the callee, it consults the Thinning Table, and adds to the stream only fields marked "USED" which results in less data being transmitted across the socket.

Byte code analysis complements source code analysis. For example, in cases in which the source to a remote method is unavailable (e.g. if it was purchased from a vendor), the source analysis described above will not be possible. Since byte codes comprise executable Java applications, they will always be available. Thus, while more difficult, byte code analysis is more widely applicable.

As in source analysis, in byte code analysis, the analyzer examines the byte codes for classes and returns a list of fields that are not necessary for an RMI invocation. When a call to the analyzer of the present invention occurs, three arguments must be included: first the analyzer must know which class to analyze; second, the analyzer must know which method within the class is the subject of the remote call under consideration; and third, the analyzer must be told which object, passed as an argument to the remote method must be thinned or distilled.

When the analyzer is invoked on a class and a remote method, the analyzer examines byte codes, determining which methods and fields are employed by the remote call in question. First, a call to the Mirror object (as defined in the related patent application divulged above) organizes the class's byte codes into a readable format. Throughout the analysis, all byte code examinations are performed on that mirrored object. In the analyzer of the present invention, the analyzer reads a list of all fields declared in the mirrored class and adds the list to a vector (called AllFields for this example). Similarly, the analyzer gathers a list of all declared methods, storing them in an array. The analyzer then searches the method list until it finds the name of a remote method to be examined. The analyzer then begins an analysis of the method by retrieving the names and types of expected parameters. If none of the parameters match the 'object-to-be-distilled' type then the method is not examined. However, this should be the rare case since there should be no reason to ask the analyzer to examine, or the distiller to distill, an object/method pairing that does not exist.

Provided that the remote method does receive the 'object-to-be-analyzed', the next phase of analysis begins. The analyzer progresses through the mirrored byte codes and looks for three situations: occurrences of member fields of the 'object-to-be-analyzed', calls to its member methods, or calls to other classes' members taking the 'object-to-be-analyzed' as an argument. The names of accessed fields are added to a vector (in this example named UsedFields) while the names of accessed methods, whether a member of the current class or another class, are pushed onto a stack to be dealt with later.

Once the remote method has been examined, the analysis phase starts. The analyzer performs analysis on the next level of methods, those discovered in the mirrored remote method's byte codes. The analyzer retrieves a method's name off of the stack and creates a mirror for that method's class. The analyzer then treats that newly retrieved method as any other method and analyzes it recursively as before. The recursive examination process continues as long as the stack contains the names of methods to be examined. At the end of this recursive analysis process, the analyzer returns a list of unused member fields. Those member fields not used by the 'object-to-be-analyzed' are specified in a text file generated by the analyzer. In order to produce this list the analyzer compares the 'AllFields' vector with the 'UsedFields' vector and provides a list of the name of any field present in the AllFields vector and not present in the UsedFields vector.

The present invention compresses the byte stream comprised of serialized objects by using program analysis (described above) to determine which data fields are actually used by the callee and eliminating those fields that are not used from the byte stream. We now describe the compression in more detail.

The compression of the preferred embodiment of the present invention operates on the byte stream before it passed between computers. Note that the compression can operate equally well before the bytes are placed on the socket (requiring a change to RMI) or by intercepting the bytes from the socket (much like the IBM WebExpress product). Similarly, the compression can operate during serialization, which avoids copying the data.

Figure 1:
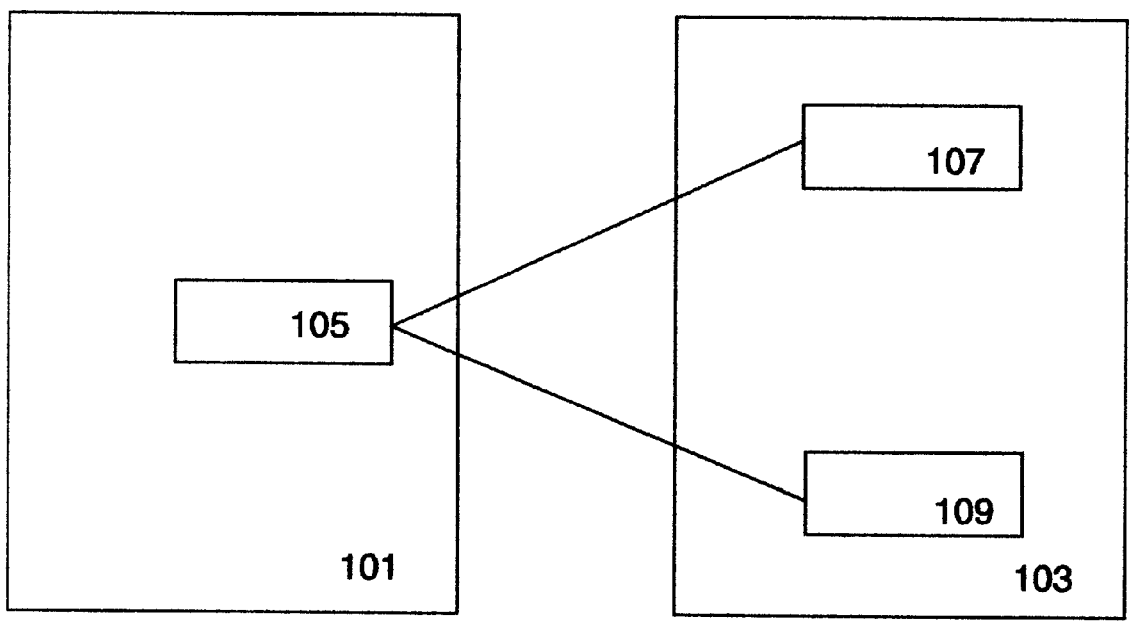
FIG. 1 depicts two computers using remote method invocation to distribute workload.
Figure 2:
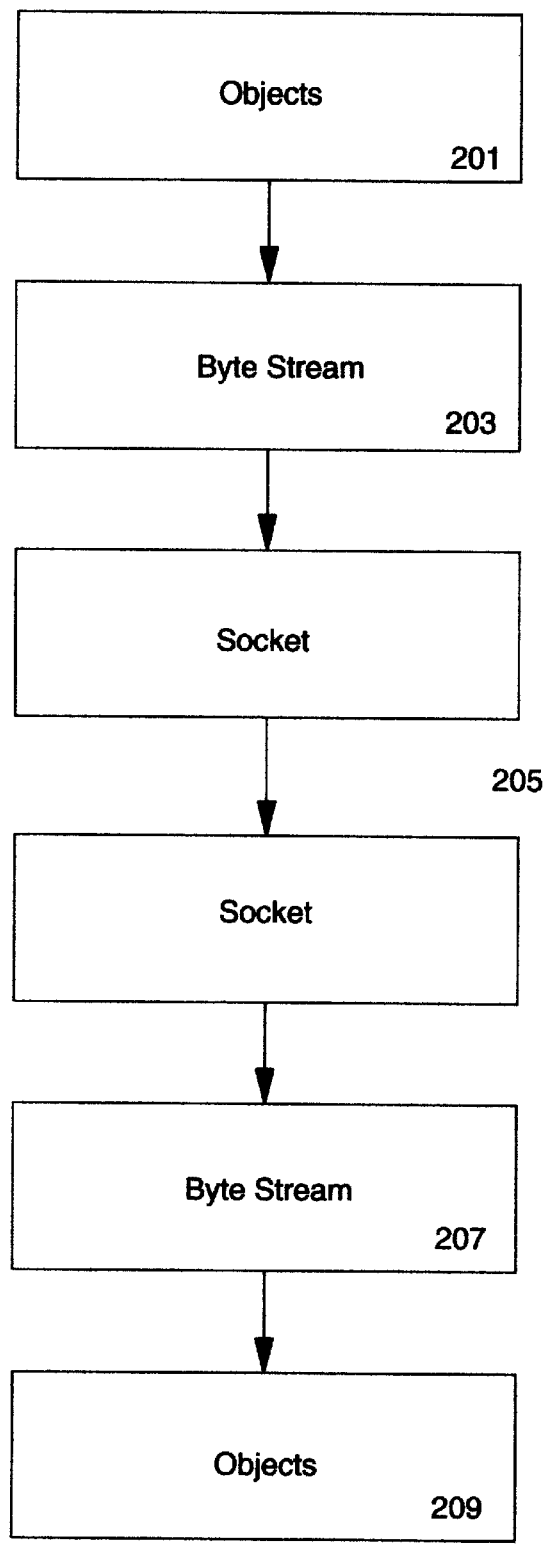
FIG. 2 depicts the transmission of information between the objects in the two distributed computers.

As shown in FIG. 2, when making a remote call, RMI calls the serialization method on all objects (201) passed as parameters. This yields a byte stream (203) that can be sent across a socket (205). The remote machine receives the byte stream (207) and reconstitutes the objects (209).

The compression works by replacing values that are not used on the remote computer (as determined by the analysis) with small type indicators (e.g. an int indicator, a float indicator) replacing the value. Arrays are replaced with the type indicator for array, and a supplemental field that indicates the size of the array. Thus, rather than sending an entire value, only the smaller type indicator is sent. This compression is relatively small for characters, but can be quite large for aggregate types such as arrays. If a variable is used, its value is left in the stream.

When the decompressor encounters a type indicator, it fills the stream with a convenient, unspecified value of the correct type. For example, all integers can be given the value zero. While this compression loses information (e.g., integers all become zero), it does not lose important information since the analysis indicated that the value will not be used on that particular method call.

In the example presented above, the analysis will determine that the call to "bar" will not access C.a or c.foo1. Thus, the compressed version of the serialization will replace those fields with small place holders. The compressed version of the serialized object will contain a serialization header, a standard description of C, a marker for A, serialization for object B, a marker for foo1 and the real foo2. This is shown in FIG. 3. In the example of FIG. 3, the byte savings for replacing or "stubbing" A and foo1 with their replacement values is: 10 * sizeof (int)+20 * sizeof (char)+sizeof (int)−2 * sizeof (marker) where "sizeof" is a function that return the size of a given type.

What is claimed is:

1. A method for reducing the amount of information transmitted across a network between two or more different portions of a distributed application running in a computer network having a local processor and at least one remote processor, said method comprising the steps of:

creating, at said local processor, a list of the variables accessible by invoking the distributed application;

identifying which variables will be passed between the distributed portions of the application;

identifying which of the variables passed between the distributed portions of the applications are available for use by the portion of the application executing on a remote processor; and, replacing variables not available for use by the portion of the application executing on a remote processor with place holders prior to transmission across the network.

2. A method as claimed in claim 1 further comprising:

creating a stream of data comprising the variables that are available for use by the distributed portion of the application executing on a remote processor and the place holders for any of the variables that will not be used by the distributed portion of the application executing on a remote processor.

3. A method as claimed in claim 2 wherein said stream is compressed prior to being transmitted to said remote processor.

4. A computer program product on a computer-readable media comprising:

Computer readable program code means for reducing the amount of information transmitted across a network between two or more different portions of a distributed application running in a computer network having a local processor and at least one remote processor, said computer-readable program code comprising:

computer readable program code means for creating, at said local processor, a list of the variables accessible by invoking the distributed application;

computer readable program code means for identifying which variables will be passed between the distributed portions of the application;

computer readable program code means for identifying which of the variables passed between the distributed portions of the applications are available for use by the portion of the application executing on a remote processor; and, computer readable program code means for replacing variables not available for use by the portion of the application executing on a remote processor with place holders prior to transmission across the network.

5. A computer program product as claimed in claim 4 further comprising:

computer readable program code means for creating a stream of data comprising the variables that are available for use by the distributed portion of the application executing on a remote processor and the place holders for any of the variables that will not be used by the distributed portion of the application executing on a remote processor.

6. A computer program product as claimed in claim 5 wherein said stream is compressed prior to being transmitted to said remote processor.

7. A computer system wherein information is transmitted across a network between two or more different portions of a distributed application running in a computer network having a local processor and at least one remote processor, said computer system comprising:

means for creating, at said local processor, a list of the variables accessible by invoking the distributed application;

means for identifying which variables will be passed between the distributed portions of the application;

means for identifying which of the variables passed between the distributed portions of the applications are available for use by the portion of the application executing on a remote processor; and, means for replacing variables not used by the portion of the application executing on a remote processor with place holders prior to transmission across the network.

8. A computer system as claimed in claim 7 further comprising:

means for creating a stream of data comprising the variables that are available for use by the distributed portion of the application executing on a remote processor and the place holders for any of the variables that will not be used by the distributed portion of the application executing on a remote processor.

9. A computer system as claimed in claim 8 wherein said stream is compressed prior to being transmitted to said remote processor.

* * * * *